United States Patent Office 3,567,473
Patented Mar. 2, 1971

3,567,473
COMPOSITION FOR MAKING
REFRACTORY ARTICLES
James Ross Drever, Philip David Zimmerman, and Allan Blaine Brink, Crystal Lake, Ill., assignors to Amsted Industries Incorporated, Chicago, Ill.
No Drawing. Continuation-in-part of application Ser. No. 584,365, Oct. 5, 1966. This application May 14, 1968, Ser. No. 728,922
Int. Cl. C04b 35/48
U.S. Cl. 106—57    12 Claims

ABSTRACT OF THE DISCLOSURE

The refractory composition includes a fusion product as well as tabular alumina, calcined alumina, alpha quartz, and a relatively small quantity of magnesium oxide, all of which ingredients are processed with a colloidal silica solution. The tabular alumina and alpha quartz may be replaced by kyanite. The fusion product may include unstabilized monoclinic zirconia and alumina alone or may comprise zirconia, alumina and either silica or magnesium oxde.

---

This is a continuation-in-part of our copending application Ser. No. 584,365, filed Oct. 5, 1966, now abandoned.

This invention relates generally to a composition for making refractory articles and more particularly to a composition from which refractory pouring tubes for the pressure pouring of molten metal can be made.

Pressure pouring of molten metal is an operation in which molten metal is formed from a source below a mold, otherwise than by gravity and/or hydrostatic head in a generally upward direction into the mold in which the material solidifies or partially solidifies. Such an operation is described in U.S. Pat. No. 2,874,424. The molten metal is forced upwardly from the source, such as a ladle, through a pouring tube. The pouring tube is immersed in the molten metal and is in open communication with the mold thereby providing a passage for the metal from the ladle to the mold.

Pouring tubes are formed from a highly refractory mix of alumina and silica among other components. In the past, these conventional pouring tubes have possessed a relatively low resistance to the thermal shocks encountered in pressure pouring. In conventional operations, the tubes are preheated to about 1000° C. and during the cyclic pouring operations they are subjected to temperatures of in excess of 1500° C. The conventional tubes have a tendency to crack during the pressure pouring and they must be frequently replaced with the attendant increase in cost of operation.

It is therefore an object of this invention to provide a composition from which pouring tubes of improved resistance to thermal shock may be produced.

Another important object of this invention is to provide such a composition whereby the tubes made therefrom have improved thermal expansion characteristics.

A further object of this invention is to provide bottom pressure casting pouring tubes of improved service life.

Another object of this invention is to provide a composition for making pouring tubes that will withstand substantial temperature variations.

These and other objects and advantages will be apparent from a reading of the following detailed description of this invention.

In accordance with the present invention, the refractory articles such as bottom pressure casting tubes are made from a finely divided mixture of dry ingredients and about five to fifteen percent, based on the total weight of dry ingredients, of colloidal silica solution having a concentration of twenty to fifty percent, preferably in the neighborhood of thirty-three percent.

The dry ingredients consist essentially of about ten to thirty percent tabular alumina, five to twenty percent calcined alumina, about eight to fifteen percent alpha quartz, and about 0.03 to 0.2 percent fused magnesium oxide, the remainder comprising a fusion product, preferably in the range of about 40–70%, based on the weight of the other dry ingredients. The tabular alumina and alpha quartz may be replaced by fifteen to thirty percent kyanite, with the calcined alumina being present in the amount of 5 to 30 percent.

As will be hereinafter more particularly described, the composition of the fusion product may be varied to include unstabilized monoclinic zirconia and alumina alone, or may also include either silica or magnesium oxide in addition to the above compounds. In the preferred embodiment of the invention, the fusion product consists essentially of about thirty to sixty percent unstabilized monoclinic zirconia, about ten to twenty percent silica and about thirty to fifty percent alumina, the proportions mentioned being based on the total weight of the fusion product. The fusion product is made by the conventional manner of melting, as in an electric arc furnace, zirconium silicate, zirconium oxide and aluminum oxide.

The dry ingredient particles are sized to provide optimum density and forming characteristics of the composition. About forty to fifty percent of the particles are about four to forty mesh, about ten to twenty percent are about forty to two hundred mesh and about thirty-eight to forty-five percent are about two hundred mesh to submicron in size. In the preferred embodiment the coarse fraction is about forty-five percent, the intermediate fraction fifteen percent and the fine fraction, about forty percent.

The fusion product, tabular alumina, calcined alumina, alpha quartz, fused magnesium oxide and colloidal silica suspension or thoroughly mixed in a mixing tank to which ice has been added to control the temperature and thereby the acidity of the batch. The batch is stirred in the tank until a slurry is produced having a consistency of frothy mud. The temperature of the slurry at this stage is about 12° C.

The slurry is then trickled into a vacuum chamber having a vacuum pressure of about 28 inches of mercury. This removes any air bubbles in the slurry. The slurry is then pumped into a mold having the configuration of the desired pouring tube where the slurry is heated to cause the colloidal silica solution to gel and thereby set the slurry into the configuration of the tube. After removal of at least a portion of the mold, the tube is dried at about 50° C. for six to forty hours and then fired in a kiln at 2650° F. or cone 16 for about three days for the complete firing cycle which includes about ten hours at 2650° F.

The following specific examples are included as illustrative of the compositions of this invention.

EXAMPLE I

The fusion product contained 47.6% $ZrO_2$, 35.7% $Al_2O_3$ and 16.7% $SiO_2$. About 48% of the composition was fusion product 4 to 40 mesh, about 11% of the composition was fusion product 40 to 200 mesh and the remainder of the composition was 200 to submicron. The dry ingredients of this batch also included by weight 23.1% tabular alumina, 8.2% calcined alumina, 9.7% alpha quartz and 0.10% fused magnesium oxide. The dry ingredients were mixed with about 10.1%, based on the weight of the dry ingredients, colloidal silica solution which had a specific gravity of 1.23 grams per cc. and 33% SiO₂.

EXAMPLE II

The fusion product contained 43.0% ZrO₂, 41.6% alumina and 15.4% silica. About 50% of the composition was fusion product 4 to 40 mesh, about 11% of the composition was fusion product 40 to 200 mesh and the remainder of the composition was 200 to submicron in size. The dry ingredients of this batch also included by weight 21.3% tabular alumina, 7.7% calcined alumina, 9.2% alpha quartz, and 0.1% fused magnesium oxide. The dry ingredients of this batch were then mixed with the same colloidal silica solution as in Example I.

EXAMPLE III

The fusion product contained 47.6% ZrO₂, 35.7% Al₂O₃ and 16.7% SiO₂. About 48% of the composition was fusion product 4 to 40 mesh, about 11% of the composition was fusion product 40 to 200 mesh and the remainder of the composition was 200 to submicron. The dry ingredients of this batch also included by weight 21.1% calcined kyanite, 21.4% calcined alumina and 0.10% fused magnesium oxide. The dry ingredients were mixed with about 10.1%, based on the weight of the dry ingredients, colloidal silica solution which had a specific gravity of 1.23 grams per cc. and 33% SiO₂.

The composition of Example I was processed in the manner indicated above into pouring tubes, which tubes were then placed in conventional bottom pressure casting equipment and were used in the production of railway wheels. None of the tubes cracked during use and there was a general reduction in the percentage of scrap.

The pouring tubes made of the compositions of this invention exhibit substantially lower thermal stress than do conventional pouring tubes made of mullite. The degree of thermal expansion for a mullite pouring tube is 56 in./in. ×10⁻⁴ at 1000° C. and 103 in./in. ×10⁻⁴ at 1500° C. whereas the degree of thermal expansion for the pouring tubes of Example I is 64 at 1000° and 78 at 1500° C. During pressure pouring the outside of the tube above the metal is about 1000° C. and the inside which is in contact with the metal is at about 1500° C. Thus the magnitude of thermal stress for the pouring tubes of this invention is substantially lower than that for the conventional pouring tubes.

As hereinbefore mentioned, the fusion product of this invention may comprise other combinations of materials, including zirconia and alumina alone, as well as zirconia, alumina and magnesium oxide. The composition of the former fusion product may range in about twenty-five to fifty percent zirconia (preferably in the neighborhood of about forty percent), with the remainder as alumina. The latter system may contain from about twenty-five to fifty percent zirconia (preferably about forty-two percent), about thirty-four to fifty-one percent alumina (preferably about forty-two percent) and about fifteen to twenty-five percent magnesium oxide (preferably about fifteen or sixteen percent).

The zirconia present in the refractory articles has been found to be important in determining the thermal expansion characteristics of the composite tube. Accordingly, it has been found preferable that the overall zirconia content of the article be at least twenty percent, while the maximum content is about forty or forty-five percent, due to practical difficulties encountered in making tubes with higher amounts of zirconia.

It can be seen from the foregoing that pouring tubes manufactured from the composition of this invention not only are resistant to thermal shock but also substantially lower the percentage of defective products made from bottom pressure casting. While this invention has been described with reference to pouring tubes for bottom pressure casting equipment, it should be understood that other refractory articles may be made from this composition.

We claim:

1. A composition for making refractory articles having resistance to thermal shock consisting essentially of about five to twenty percent by weight tabular alumina, about ten to thirty percent by weight calcined alumina, about eight to fifteen percent by weight alpha quartz, about 0.03 to 0.2 percent by weight fused magnesium oxide, about five to fifteen percent based on the total weight of dry ingredients of colloidal silica solution having a concentration of about twenty to fifty percent, and about forty to seventy percent of a finely divided fusion product consisting essentially of about twenty-five to fifty percent unstabilized monoclinic zirconia and about fifty to seventy-five percent alumina, the total amount of zirconia being present in an amount to constitute at least twenty percent of the overall composition of the refractory article.

2. A composition for making refractory articles having resistance to thermal shock consisting essentially of about five to twenty percent by weight tabular alumina, about ten to thirty percent by weight calcined alumina, about eight to fifteen percent by weight alpha quartz, about 0.03 to 0.2 percent by weight fused magnesium oxide, about five to fifteen percent based on the total weight of dry ingredients of colloidal silica solution having a concentration of about twenty to fifty percent, and about forty to seventy percent of a finely divided fusion product consisting essentially of about twenty-five to fifty percent unstabilized monoclinic zirconia, about thirty-four to fifty-one percent alumina, and about fifteen to twenty-five percent magnesium oxide.

3. A composition for making refractory articles having resistance to thermal shock consisting essentially of about five to twenty percent by weight tabular alumina, about ten to thirty percent by weight calcined alumina, about eight to fifteen percent by weight alpha quartz, about 0.03 to 0.2 percent by weight fused magnesium oxide, about five to fifteen percent based on the total weight of dry ingredients of colloidal silica solution having a concentration of about twenty to fifty percent, and about forty to seventy percent of a finely divided fusion product consisting essentially of about thirty to sixty percent zirconia, about ten to twenty percent silica, and about thirty to fifty percent alumina.

4. The composition according to claim 3 wherein said fusion is in the amount of about fifty-nine percent and comprises 47.6% ZrO₂, 35.7% Al₂O₃, and 16.7% SiO₂.

5. The composition according to claim 4 wherein said composition comprises about 23.1% tabular alumina, about 8.2% calcined alumina, about 9.7% alpha quartz, about 10.1% colloidal silica solution and about 0.10% fused magnesium oxide.

6. The composition according to claim 3 wherein said fusion is in the amount of about sixty-two percent and comprises 43.0% ZrO₂, 41.6% Al₂O₃ and 15.4% SiO₂.

7. The composition according to claim 6 wherein said composition includes about 21.3% tabular alumina, about 7.7% calcined alumina, about 9.2% alpha quartz, about 10.1% colloidal silica solution and about 0.1% fused magnesium oxide.

8. A pouring tube for pressure casting of metals made from the composition of claim 1.

9. A composition for making refractory articles having high resistance to thermal shock consisting essentially of a finely divided mixture of a fusion product in the amount of about forty to seventy percent by weight of the dry ingredients, about five to thirty percent calcined alumina, about fifteen to thirty percent calcined kyanite, about five to fifteen percent, based on the weight of the dry ingredients, of a colloidal silica solution having a concentration of about twenty to fifty percent and about 0.03 to 0.2% based on the weight of the dry ingredients of fused magnesium oxide, said fusion product consisting essentially of about thirty to sixty percent unstabilized monoclinic zirconia, about ten to twenty percent by weight silica, and about thirty to fifty percent alumina, and wherein said zirconia constitutes at least about twenty percent of the total weight of the article.

10. The composition according to claim 9 wherein the composition contains about 21.1% calcined kyanite and about 21.4% calcined alumina.

11. A pouring tube for pressure casting of metals made from the composition of claim 2.

12. A pouring tube for pressure casting of metals made from the composition of claim 3.

References Cited

UNITED STATES PATENTS

| | | | |
|---|---|---|---|
| 2,271,369 | 1/1941 | Fulcher et al. | 106—57 |
| 2,332,014 | 10/1943 | Schwartzwalder | 106—57 |
| 3,035,929 | 5/1962 | Hine et al. | 106—57 |
| 3,132,953 | 5/1964 | Alper et al. | 106—57 |

JAMES E. POER, Primary Examiner

U.S. Cl. X.R.

106—65, 69